US008874500B2
US 8,874,500 B2

(12) United States Patent
Sandholdt et al.

(10) Patent No.: US 8,874,500 B2
(45) Date of Patent: Oct. 28, 2014

(54) RULE BASED PROCESSING SYSTEM AND METHOD FOR IDENTIFYING EVENTS

(75) Inventors: Daniel Sandholdt, Secaucus, NJ (US); Erick Berkowitz, Rivervale, NJ (US)

(73) Assignee: Barclays Capital Inc., New York, NY (US)

(*) Notice: Subject to any disclaimer, the term of this patent is extended or adjusted under 35 U.S.C. 154(b) by 1050 days.

(21) Appl. No.: 12/639,381

(22) Filed: Dec. 16, 2009

(65) Prior Publication Data

US 2010/0205134 A1 Aug. 12, 2010

Related U.S. Application Data

(60) Provisional application No. 61/139,353, filed on Dec. 19, 2008.

(51) Int. Cl.
*G06N 5/00* (2006.01)
*G06F 1/00* (2006.01)
*G06Q 10/06* (2012.01)

(52) U.S. Cl.
CPC ................................. *G06Q 10/06* (2013.01)
USPC ............... 706/47; 707/776; 705/320

(58) Field of Classification Search
USPC ........................................................ 706/47
See application file for complete search history.

(56) References Cited

U.S. PATENT DOCUMENTS

| 7,124,145 | B2 | 10/2006 | Surasinghe |
| 7,130,836 | B2 | 10/2006 | Grosser et al. |
| 2003/0220860 | A1 | 11/2003 | Heytens et al. |
| 2004/0177053 | A1 | 9/2004 | Donoho et al. |
| 2008/0036659 | A1* | 2/2008 | Smith et al. ................... 342/454 |
| 2008/0082376 | A1* | 4/2008 | Kennis et al. ..................... 705/7 |
| 2008/0256013 | A1 | 10/2008 | Loveless |
| 2008/0312858 | A1 | 12/2008 | Baseman et al. |
| 2009/0106063 | A1* | 4/2009 | Minsky et al. .................... 705/7 |

OTHER PUBLICATIONS

International Search Report of PCT/US09/68852 dated Mar. 1, 2010.
Written Opinion of PCT/US09/68852 dated Mar. 1, 2010.
Stanford Encyclopedia of Philosophy, Many-Valued Logic, http://plato.stanford.edu/entries/logic-manyvalued/, First published Tues, Apr. 25, 2000; substantive revision Weds., Dec. 23, 2009, pp. 1-22.
Wikipedia, Multi-valued Logic, http://www.princeton.edu/~achaney/tmve/wiki100k/docs/Multi-valued_logic.html, Sep. 30, 2013, pp. 1-6.

* cited by examiner

*Primary Examiner* — Jeffrey A Gaffin
*Assistant Examiner* — Kalpana Bharadwaj
(74) *Attorney, Agent, or Firm* — Morgan, Lewis & Bockius LLP

(57) ABSTRACT

The present invention generally relates to a computerized system and method for creating, optimizing, and using a rules processing system that evaluates multiple rules against facts and events and detects, identifies, reacts to, and reports on events of interest. Events of interest may pertain to any subject matter, and in an embodiment, relate to securities (e.g., stocks, bonds, etc.) transactions. The system and method of the present invention also identifies patterns in large data sets using dynamically changing rules, and as a result, makes the processing and use of rules more efficient.

27 Claims, 5 Drawing Sheets

Fig. 4

Rule Optimization: Inverted Indexes

Rules

Rule1 = Fact1(Y) & Fact2(N)

Rule2 = Fact2(Y) & Fact3(Y)

Rule3 = Fact1(Y) & Fact2(Y) & Fact3(N)

Inverted Rule Index

Fact1:   Y = Rule1, Rule2, Rule3
         N = Rule2

Fact2:   Y = Rule 2, Rule3
         N = Rule 1

Fact3:   Y = Rule1, Rule 2
         N = Rule 3

| Step | Fact | Value | Fact Rules | Potential Rules | Matching Rules |
|---|---|---|---|---|---|
| 1 | Fact 1 | Y | Rule 1, Rule 2, Rule 3 | Rule 1, Rule 2, Rule 3 | ? |
| 2 | Fact 2 | Y | Rule 2, Rule 3 | Rule 2, Rule 3 | ? |
| 3 | Fact 3 | N | Rule 3 | Rule 3 | ? |
| 4 | None | N/A | N/A | Rule 3 | Rule 3 |

| Step | Fact | Value | Fact Rules | Potential Rules | Matching Rules |
|---|---|---|---|---|---|
| 1 | Fact 1 | N | Rule 2 | Rule 2 | ? |
| 2 | Fact 2 | N | Rule 1 | None | None |

RULE BASED PROCESSING SYSTEM AND METHOD FOR IDENTIFYING EVENTS

RELATED APPLICATIONS

This non-provisional patent application claims priority to U.S. Provisional Patent Application Ser. No. 61/139,353, filed Dec. 19, 2008, the contents of which are incorporated herein by reference in their entirety.

BACKGROUND OF THE INVENTION

There is a variety of known rule based systems for processing business information, including, production systems, business rules engines, expert systems, event-driven architectures, and decision matrices. These systems often use sequential algorithms or inferential algorithms to process data against specific rules. Although these algorithms have certain benefits, they also present various problems which render the processing of such rules inefficient, difficult, and cumbersome.

For example, sequential algorithms typically process data by applying rules in a specified order. As a result, sequential algorithms can quickly process data and make simple repetitive decisions. However, sequential algorithms are often difficult to implement when using complex logic that includes many interdependent rules. Moreover, sequential algorithms often need to repetitively loop through the rules multiple times when trying to solve inference style problems. As a result, sequential algorithms can be time consuming and cumbersome.

Inference algorithms, typically involve rete-style forward or backward chaining algorithms. Thus, unlike sequential algorithms, the order in which a rule is executed is dynamically decided by the algorithm as it processes the rules. As such, it is not necessary to understand the interrelationships of rules at the time they are designed. However, inference algorithms often process rules and data in a time consuming and inefficient manner. To this end, when using inference algorithms, all rules are typically evaluated against all data stored in a database. Inference algorithms do not distinguish between data and rules that have already been evaluated, and thus, the same rules are often evaluated against the same data multiple times before a decision is rendered. Adding to theses inefficiencies, the logic used in inference algorithms is difficult to understand and visualize, and thus, is susceptible to having many unexpected bugs. Debugging these bugs can be very difficult because rules can interact in unexpected ways at runtime. Additionally, bugs are difficult to recreate because the algorithm is not guaranteed to evaluate the rules in the same order each time.

There is a long felt need for a system and method that can efficiently process data in terms of time and processor resources yet dynamically adjust to the changing conditions of the data being analyzed.

SUMMARY OF THE INVENTION

The present invention relates generally to a computer system and computer implemented method for creating, optimizing and using rules in fast and processor efficient manner to analyze the occurrence of identified events and audit the efficiency and accuracy of such identification.

A computerized method for according to an exemplary embodiment of the present invention comprises the steps of: electronically identifying one or more requirements; developing using a logic model unit one or more logic rules based on the one or more requirements; generating using a data adaptor one or more binary facts based on collected data; and identifying using a rules engine an occurrence of one or more events by applying the one or more logic rules to the one or more binary facts.

In at least one embodiment, the method further comprises tracking a number of occurrences of the one or more events.

In at least one embodiment, the method further comprises determining whether an alert should be generated for the occurrence of the one or more events.

In at least one embodiment, the method further comprises tracking one or more reoccurring patterns in the one or more events.

In at least one embodiment, the method further comprises the step of modifying using a rule tuning engine the one or more logic rules based on the one or more reoccurring patterns.

In at least one embodiment, the method further comprises generating an audit report.

In at least one embodiment, the one or more requirements are based on regulations of the Securities and Exchange Commission.

In at least one embodiment, the collected data comprises at least one of the following: market data, trading system data, historic data and reference data.

In at least one embodiment, the step of generating comprises storing the one or more binary facts in a cache memory.

A system according to an exemplary embodiment of the present invention comprises: a logic model unit that develops one or more logic rules based on one or more requirements; a data adaptor that generates one or more binary facts based on collected data; and a rules engine that identifies an occurrence of one or more events by applying the one or more logic rules to the one or more binary facts.

These and other features of this invention are described in, or are apparent from, the following detailed description of various exemplary embodiments of this invention.

BRIEF DESCRIPTION OF THE DRAWINGS

The features and advantages of the present invention will be more fully understood with reference to the following, detailed description of an illustrative embodiment of the present invention when taken in conjunction with the accompanying figures, wherein:

FIG. 4 is an example of an implementation of an embodiment of the present invention.

DETAILED DESCRIPTION OF EMBODIMENTS OF THE PRESENT INVENTION

Figure 1:
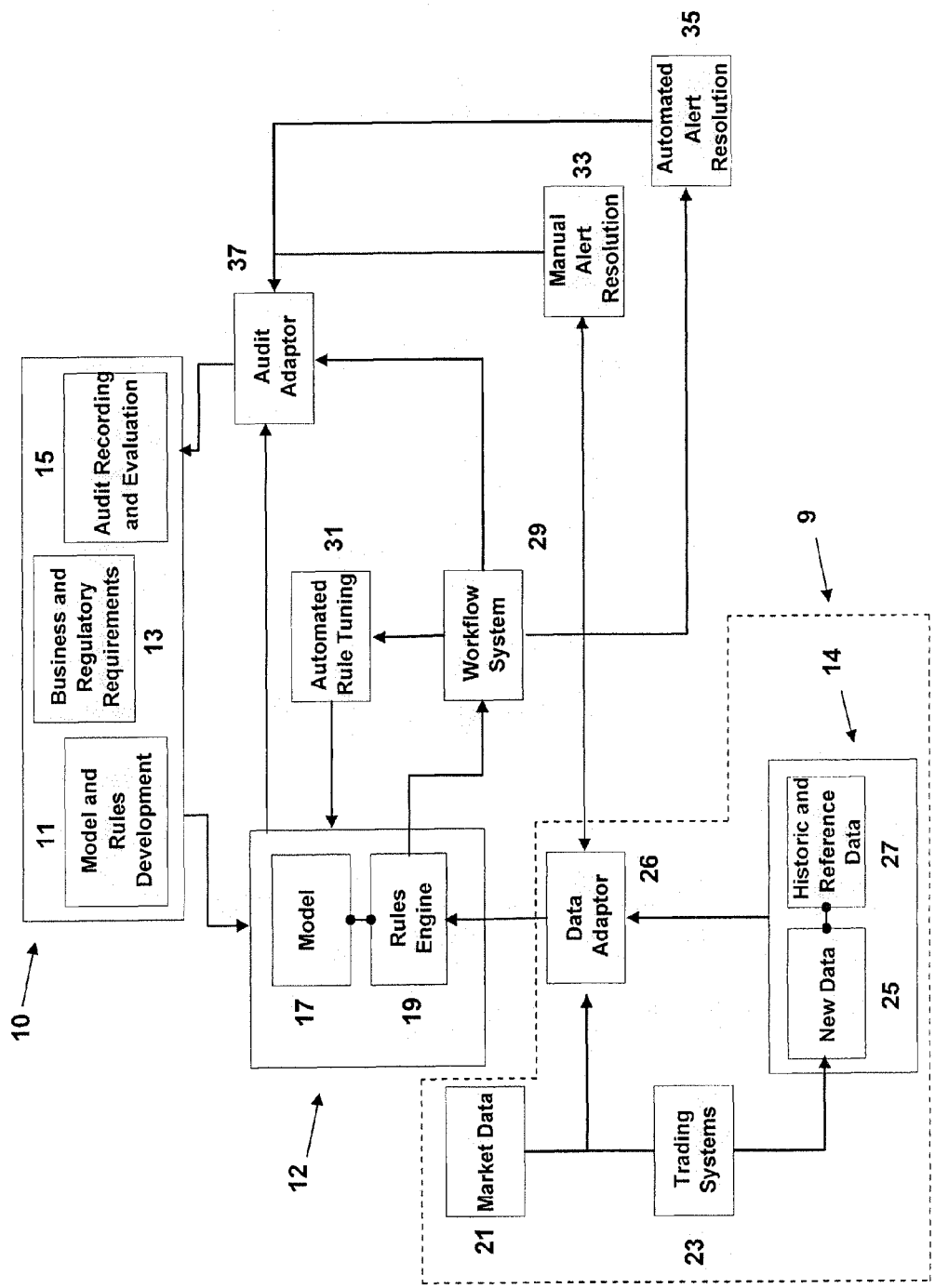
FIG. 1 is a block diagram of an embodiment of the system and method of the present invention.

The present invention generally relates to a computerized system and method for creating, optimizing, and using a rules processing system that evaluates multiple rules against facts and events and detects, identifies, reacts to, and reports on events of interest in a fast and efficient manner, yet is adaptive to the information being processed. Events of interest may pertain to any subject matter, and in an embodiment, relate to securities (e.g., stocks, bonds, etc.) transactions. The system and method of the present invention also identifies patterns in large data sets using dynamically changing rules, and as a result, makes the processing and use of rules more efficient.

According to the present invention and as discussed in further detail below, a certain type of information of interest to be evaluated is identified. For example, in an embodiment, the information of interest could be analysis of trading data to determine if rules governing such trades are potentially being violated. Based on this information, a logic model and rules needed to evaluate the information of interest are established. As an example, a model and rules could be to analyze an organization's trade data to determine if transactions in a restricted stock or security are being made based on non-public material information. To do so, factual data is collected and/or extracted from one or more (internal and external) data sources. Factual data in this example could include the trade information of the organization, trade information of the marketplace, and historical trade information. The factual data, especially when it comes from multiple different sources may have to be normalized to be processed. This factual data (after normalization if necessary) is then processed by software of the present invention and converted into binary "Facts" (see discussion below).

In addition to the binary information which will be used to identify whether a Rule condition has been met, the factual data may also include identification information which can be used to link the binary Facts to a specific event being analyzed. For example, the identification information could be in this example the transaction number. The transaction number can be used if the Fact in question is identified by the system to correspond with a tracked event, to provide the report with additional information about the tracked event. By converting the data to be analyzed into binary facts and analyzing it using Rules based on these binary Facts, the processing of data, such as surveillance data in a trading system is performed faster, more efficiently and with less processing time.

Separately, Rules are created by which the binary Facts can be analyzed to determine whether a condition can be met. The algorithm of the present invention processes the rules and binary Facts, and outputs one or more signals that identify certain events of interest. For example, if the rules require a yes answer to a binary Fact pertaining to whether a certain listed stock was traded during a certain specified period, and the Fact information regarding a particular trade answered yes or "1" to this binary Fact, then a signal will be produced to identify this event of interest. This algorithm combines certain principles of sequential algorithms with certain principles of inference algorithms to make the processing of the rules and binary Facts more efficient. The output signal(s) is then further processed by the system.

Information and Rules Generated and Used by Present Invention

Before describing the specific components of the system and operation of the method of the present invention, the various types of data, information, and rules that are generated, processed, and used by the system and method are described.

More particularly, "Facts", in the context of the present invention, are created using data from one or more available data sources, to identify, through the use of the Rules of the present invention, the occurrence of certain events. A Fact comprises a statement that is representable by a question having only a "Yes" (i.e., true) or "No" (i.e., false) answer. This information can be digitally represented with either a "1" or a "0". For example, the question "Is that animal a cat?" (which is not a fact) can be represented as a Fact (e.g., "that animal is a cat"). The fact can be represented in binary form, such as using a "1" to represent "Yes, that animal is a cat" or "0" to represent "No, that animal is not a cat". Alternatively, "0" could be used to represent a "Yes" answer, and "1" to represent a "No" answer. A question that cannot be answered with a simple "Yes" or "No" response is not a Fact, in the context of the present invention. For example, the question "What type of animal is that?" cannot be represented as a Fact for purposes of the present invention. In an embodiment, a Fact can have a modal status of being Possible, Contingent, or Necessary. Facts may also be linked to one or more identification information, such as "Tabby" in this example.

An "Event" comprises a collection of Data Elements representing information known about a particular state of a system at a given point in time. A "Data Element" comprises a raw datum extracted from an Event that represents a unit of information about that event. Facts are created using information from the Data Elements.

An "Asserted Fact" comprises a Fact that has been associated with a specific Data Element and has been assigned a truth value within a Context. For example, the Fact "that animal is a cat" may be assigned the value of "True" (e.g., "1") with regard to the Data Element "Tabby" in the Context of "pets that I own".

A "Context" comprises the scope/universe that an Asserted Fact is valid within. A Context can provide a contingent modality of a Fact. In this regard, the exact same Fact and Data Element can be assigned different truth values depending upon the Context in which the Fact is asserted. For example, the Fact "that animal is a cat" is assigned a value of "True" with regard to the Data Element "Tabby" in the Context of "pets that I own". However, in the Context of "friends that I know", the same Fact "that animal is a cat" is assigned a value of "False" with regard to the same Data Element "Tabby". In an embodiment, a Fact can only exist in a single Context, but when Asserted, the Asserted Fact can exist in any number of instances of that Context. To this end, an Asserted Fact should have the same or different truth value within any multiverse in which that Context exists. However within any single instance of a Fact's Context, the corresponding Asserted Fact should only have one truth value and it must be logically consistent.

In an embodiment, Rules can be created to identify the occurrence of an event of interest. A Rule comprises a conjunction of Facts, along with pre-specified truth values for those Facts, that defines the identification criteria for an event of interest. In this embodiment, disjunctions are not allowed within a single Rule. However logical disjunctions can be represented through the creation of multiple disjunctive Rules, each of which is a conjunction of Facts, based upon the logical distributivity property of conjunctions. Any Fact that exists within the defined universe of Facts, but is not included in a specific Rule, is considered to be modally Possible, and will cause that Rule to disregard the truth value of the corresponding Asserted Fact when the Rule is evaluated.

In an embodiment, the evaluation of Rules is made even more efficient by searching for and using "Matching Rules." A Matching Rule comprises a Rule for which all Facts and pre-specified truth values for those Facts from which the Rule is constructed are a complete subset of the set of Asserted Facts from an event, or combination of events. In this regard, all Facts from the Rule are contained within the set of Asserted Facts from the event, and the pre-specified truth value of each Fact from the Rule is the same as the truth value of the corresponding Asserted Fact from the event. The set of Asserted Facts may contain additional Possible Facts that are not defined in the Rule, but any Asserted Facts whose underlying Fact does appear in the Rule must have the same truth value (Contingent and Necessary) as pre-specified within the Rule.

In the present invention, both Rules and Facts may be classified by Category to enable the efficient processing of the Facts and Rules by the algorithm. A Fact Category comprises a set to which a Fact is a member along with other member Facts based upon arbitrary homogeneous characteristics among those Facts. A Fact should only be a member of one Fact Category. A Rule Category is any member, excluding the empty set, of the power set of the union of all Fact Categories to which the Facts the Rule is constructed of belong. For example, in an embodiment, the intersection of a Fact's [f1] Fact Category and a Rule's [r1] Rule Category will return a non-empty set if at least one Fact from the Fact's [f1] Fact Category was used to construct the Rule [r1], but does not necessarily imply that the Fact [f1] was used in the construction of the Rule [r1]. In other words, a non-empty intersection will exist between the Fact's [f1] Fact Category and the Rule's [r1] Rule Category if another Fact with the same Fact Category as the Fact [f1] was used to construct the Rule [r1].

The algorithm of the present invention also can search for and use Rule Clusters to streamline the rule selection and evaluation process. A Rule Cluster comprises the set of all Rules that are members of a particular Rule Category. A Rule can belong to as many distinct Rules Clusters as there are distinct Fact Categories of the Facts from which the Rule is constructed.

As discussed below, the algorithm may search for and use Potentially Matching Rules to further streamline the rule selection and evaluation process. In this regard, for any Rule Category of a Rule Cluster to which a Rule belongs, if the negated truth value of every Fact in that Rule, having the same Fact Category as the Rule Category, does not exist in an Event's complete subset of all Asserted Facts having the same Fact Category as the Rule Category, then that Rule is a Potentially Matching Rule of that Event in terms of that Rule Category. Thus, in an embodiment, if for any Rule Category to which a Rule is a member, if all Facts from which the Rule are constructed that do not have the same Fact Category as the Rule Category were removed from the Rule (or were made modally Possible), then the Rule is a Potentially Matching Rule if and only if the Rule, after the modification, is a Matching Rule.

The Rules Engine

Against the foregoing background, a Rules Engine (in the form of an algorithm to be applied by a computer system) in accordance with an embodiment of the present invention is described. More particularly, in this embodiment, Facts may be created from Data Elements collected/extracted and to the extent necessary normalized from other sources. The Facts created will be in the form of one or more binary Facts, with appropriate identification information attached. Rules are designed independent of one another, but may then be automatically clustered together, by the Rules Engine, based upon the Fact Categories of the Facts that the Rules are constructed from.

The order in which Rules are executed by the Rules Engine may be controlled (e.g., specified) at the time that the rules are designed, or modified as discussed below, such as by Automated Rule Tuning engine discussed below. In this regard, a rule designer can establish a predefined order in which the various Categories of Rule Clusters are evaluated. This predefined order may, in an embodiment of the invention, be modified by the Automated Rule Tuning engine discussed below. Moreover, the Rule Categories are assigned to a Rule Cluster at the same time as the Fact Categories of the underlying Facts. Again, in an embodiment of this invention, the Automated Rule Tuning engine may reassign one or more Rule Categories to one or more Rule Clusters, during operation of the system. As a result, the sequencing of Rules may determine not only the order in which rules should be executed by the Rules Engine, but also the order in which Data Elements should be extracted from the Event data and evaluated against by the Rules.

If a Rule is constructed with Facts from different Fact Categories, then that Rule may be placed in multiple Rule Clusters. All Rules within a single Rule Cluster should be evaluated as part of the same process step. For improved efficiency, the Rules Engine should only evaluate the Rules within a Rule Cluster against an Event's Asserted Facts that have the same Fact Category as the Rule Cluster's Rule Category. Therefore, in this embodiment, any Rules from the Rule Cluster that "match" the Facts (having the same category as the Rule Cluster) from the Event data are Potentially Matching Rules and do not necessarily "match" the entire event. Thus, in this embodiment, any matching Rules from a single Rule Cluster are simply a set of Rules that can potentially match the entire event.

After the Rules Engine evaluates all Rule Categories that a Rule belongs to, the Rules Engine may determine whether or not a Rule is a Matching Rule and actually "matches" the entire event. Any Rule that is not a Potentially Matching Rule after processing a Rule Cluster to which the Rule is a member of should not become a Matching Rule. Therefore, any Rules that fail to become Potentially Matching Rules after processing of a Rule Cluster to which those Rules are members of are be removed from evaluation from any other yet to be processed Rule Clusters to which those Rules also belong.

As a result of the foregoing process, the number of Rules to be evaluated may be decreased as each Rule Cluster is processed. Any Potentially Matching Rules that remain after the final Rule Cluster is processed are the total set of Matching Rules that match the entire Event. As a result of the foregoing process, one or more signals are output that identify the occurrence of an Event of Interest.

Advantages of the Rules Engine

The Rules Engine of an embodiment of the present invention may evaluate and process rules faster than sequential and inference algorithms. To this end, the Rules Engine may evaluate only a limited amount of data against just portions of a minimal and continuously decreasing set of Rules. Moreover, using this embodiment of the Rules Engine, it is easier to understand and visualize model logic for the Rules, yet Rule interdependencies do not need to be identified at the time that the Rules are designed.

Moreover, in an embodiment of the present invention, Rule relationships and overlap of rules can be more readily determined at design time by reviewing the Facts and Fact Categories of which the Rules are constructed. Additionally, debugging and bug reproduction remains relatively straightforward because the sequence in which Rules are evaluated at runtime can be determined based upon the ordering of the Fact Categories to which the Rule's Facts belong. Therefore, even though the ordering of a Rule is not specified, that Rule will consistently match or not match an event after the same runtime execution step whenever the Rule Clusters are processed in the same sequence.

The Rules Engine in an embodiment of present invention may also select only Rules for evaluation that are relevant to Facts being processed. Moreover, the Rules Engine may evaluate Rules against only potentially matching data. This allows for more efficient processing of large rule sets and large data sets by reducing the amount of data, number of events, and number rules that need to be evaluated.

An embodiment of the present invention may also group Related Facts into Fact Categories, thus providing for multiple Facts in the same Fact Category to be Asserted and evaluated in one process step instead of multiple steps which can be more time consuming and inefficient in terms of processor time. Additionally, Rules constructed of multiple Facts from the same Fact Category can be pre-evaluated and potentially discarded prior to looking up or Asserting other Facts from the Rule that belong to other Fact Categories.

In an embodiment of the invention, the Rules Engine may dynamically choose Rules for evaluation based on the Fact Categories that an incoming Data Element is related to. This allows for greater performance against large rule sets and large data sets by reducing the number of rule evaluations that need to be performed, thus taking less time and being more efficient in computer processor use.

In an embodiment of the present invention, all Rules containing Facts from the same Fact Categories may be evaluated as part of the same process step. This allows for greater performance against large rule sets and large data sets by reducing the number of rule evaluations that need to be performed.

In an embodiment of the present invention, the order in which Fact Categories are evaluated can be pre-configured independently on a model-by-model basis. This allows for greater performance against rule sets and data sets where information is known before hand regarding the distribution, relevance, and occurrence of specific Facts within the rule sets and data sets by allowing the order of Rule evaluation to be configured to so that the maximum number of potentially matching Rules are discarded after processing minimal number of Facts.

An embodiment of the present invention also may utilize a self optimizing cache to store frequently processed Facts along with the Potentially Matching Rules from the Rule Cluster that has the same Rule Category as that Fact's Fact Category (given that those Rules could potentially match any event that contains that Fact with the assumption that all other Facts that those Rules consist of have the potential of matching any other event as well). This allows for better performance against large rule sets and large data sets, where the same Data Elements frequently appear in the Events, by allowing Rule evaluation to be bypassed. Additionally, the cache automatically optimizes itself during runtime so that frequently used Facts can be retrieved faster from the cache then less frequently used Facts. This allows for internal system memory management to be always be optimized for the best real-world performance rather than simply reducing the theoretical worst-case performance as is the case with typical optimization methods.

Additionally, in an embodiment of the present invention, the Rules Engine may process Facts in multiple Contexts. For example, as discussed above, the same Fact can be either True or False at the same time based on the Context in which that Fact was Asserted. This apparent contradiction can be handled by evaluating the Rules against those Facts, and all other Facts that the Rules consists of, in each Context separately and across other Contexts, thereby allowing a Rule to match an Event in any/all/none of those Contexts.

In an embodiment, Rule design, auditing, and interpretation may be possible by both primary and third-party individuals (e.g. non-technical users) using a table, spreadsheet, decision matrix, flow-chart, or other stylistic representations of the Rules and Facts.

In an embodiment, Facts may also be reused to design new Rules without the Rule Designer having to know any detailed information about the Fact other then the concept that that Fact represents. For example, the Rule Designer does not need to know any information about the Data Elements and values of those elements within an Event in order to create a Rule using an existing Fact.

In an embodiment, an Automated Rule Tuning engine may be used in conjunction with the Rule Engine to analyze the efficiency of the Rules being applied based on the output of the Rules Engine and modifies the Rules, Rule Clusters, Asserted Facts etc. to improve the efficiency and decrease the processing time.

Advantages of Binary Facts

As discussed below, there are several advantages to creating and using binary Facts to analyze events. Raw Data Element values should not be used at Rule authoring time. Rather, all raw values should be converted into binary Facts in order to be used by a Rule. As a result, after a Fact has been asserted once, it may then be reused in multiple rules since the Fact represents a generic "concept" instead of a raw data value. Moreover, Rule execution performance increases dramatically (especially when executing the same Rule repeatedly) because the evaluation of the rule becomes a fixed cost (binary) operation. Furthermore, Rules may require no modification even if the underlying raw data values change due to new data sources, changes in thresholds, policy changes, etc. Furthermore, Rules can be authored by individuals closer to the business requirements source, without having to have knowledge of the underlying data or other low-level details. For example, in the context of an implementation for a surveillance system of trades by an organization, the Rule author does not need to know the code for a client's account. Rather, the Rule author only needs to know that the Fact "Is Client Account" exists.

Additional Exemplary Embodiments of the Present Invention

An example of an embodiment of the present invention is illustrated in FIG. 1. Block 10 represents the fundamental conceptual guidelines on how the system and method is to be developed and implemented. Block 13 represents the business and regulatory requirements that this embodiment seeks to implement. One example of such business and regulatory requirement is the Security and Exchange Commission's ("SEC") regulations that seek to prevent insider trading by restricting the trade of stocks or securities by individuals having material knowledge of non-public information about such stocks or securities.

The business and regulatory requirements of block 13 may, in turn, be developed into models and rules 11 to identify the occurrence of certain events that are pertinent the business and regulatory requirements of block 13. For example, for the SEC regulations referred to above, rules and model logic 11 are created to flag trades of securities that are on a restricted list (e.g., a list of stocks and companies that a securities trading firm may be transacting business with during a particular period of time). Block 10 also includes an audit recording and evaluation system 15 that comprises information generated from the rules which can be later used during audits or other evaluations.

Once the models and rules development 11 has been determined, surveillance and/or security systems and procedures to be implemented may be programmed into computer system 12, which includes a model unit 17 and rules engine 19. The computer system may include one or more computer readable media on which database information and software including the rules engine may be stored, one or more processors on which the rules engine may be run to analyze data, and one or more communication devices to communicate with other computer systems as appropriate. The model unit 17 defines, in a computer language format, the specific rules that are to be evaluated. For example, in implementing the model unit 17 for the SEC regulations discussed above, a Rule may be created that flags trades in which a trade of restricted security has been made.

In order to develop these Rules, Facts (as discussed above) relevant to the Rules are identified and created, and a determination as to whether the Facts meet the rules set forth by the model unit 17 is made. In this regard, the model unit 17 sets forth specific model rules which seek to capture behavior(s) that is sought to be flagged or identified by the rules engine 19. More particularly, data may be gathered from one or more data sources that relates to the business and regulatory requirements 13 and model and rules development 11. In the above example of SEC regulations seeking to capture trades in restricted securities, the following types of data may be collected from various internal and/or external data sources. For example, data relating to all trades of a particular stock on a given day may be gathered from public sources of market data 21 (e.g., Bloomberg news). Additionally, data relating to specific trades securities that are of interest may be collected from in-house (i.e., private) security trading systems 23. Historic and reference data 27 relating to prior trades of a security may also be collected from private and public data sources. Examples of historic or reference data 27 could include the typical and prior trades that have been made for a given stock over a given time period.

The data from the trading system 23 and/or market data 21 may be fed into new data module 25. A data adapter 26 retrieves data from market data 21, trading systems 23, new data 25, and/or historic and reference data 27 modules. Based upon these varying sources of data input into the data adapter 26, such data is modified to include one or more pieces of binary Facts (as discussed above). The rules engine 19 then processes and evaluates the binary Facts (e.g., yes or no (or 1 or 0) values) and outputs one or more signals that identify the occurrence of an event of interest (e.g., a trade of security on a restricted list). The rules engine 19 only processes Asserted Facts, that is, Facts that have been assigned a true or false value within a specific context. The output may then be sent to a work flow system 29, which in turn, directs the output signal (and its related data) to an appropriate module for further analysis.

For example, the work flow system 29 may send the output signals back to the data adapter 26, which could, in turn, keep track of and count how many times an individual is identified as trading securities on a restricted list. The work flow system 29 may also send the data to an appropriate alert resolution system, such as manual alert resolution system 33 or automated alert resolution system 35, where alerts are generated (manually or automatically, respectively) to signify the occurrence of an event of interest (e.g., an improper trade of a security on a restricted list).

The work flow system 26 may also keep track of reoccurring patterns in the output signals generated by the rules engine 19. Reoccurring patterns could include, for example, trades of securities having certain timing, trades of certain securities by certain individuals, etc. Once identified, the reoccurring patterns may then be provided to the automated rule tuning engine 31, which in turn, may modify the Rules on-the-fly, so that they can be more efficiently processed by rules engine 19 when such patterns repeat in the future. These modified rules are stored in model unit 17. Alternatively, the reoccurring patterns may be tracked and identified by the automated rule tuning engine 31.

The work flow system 26 may also send its output signals directly to the audit adapter 37, which processes this information, along with outputs received from alert resolution systems 33 and 35. The information processed by the audit adaptor 37 is then used to prepare and generate an appropriate audit report, which is provided to the audit recording and evaluation unit 15. The audit report may indicate that flags have been output and the rules that were used to trigger such flag. Thus, for example, when a signal for manual alert resolution 33 is sent to audit adapter 37, a corresponding signal of the model unit 17 being used at the time that the signal was generated may be sent from computer system 12 to the audit adapter. This signal may be sent simultaneously with the alert, or logged for later reference, or sent only when the rule is changed, for example. In this manner, the audit adapter 37 can prepare a report which will allow the audit authority and evaluation module 15 to identify the events of interest, as well as evaluate the effectiveness and accuracy of the overall system and method.

An exemplary implementation of the present invention which can be used with a surveillance system for a trading system is further illustrated. In this example, Facts A-F are defined including the following values, which can be defined as true or false (or 1 or 0): Fact A=Product is on Watch List; Fact B=Trade was a "Buy"; Fact C=Account Belongs To Firm; Fact D=Net Proceeds are greater than $3,000; Fact E=Product is an Equity; and Fact F=Trading Strategy is Bullish. The Rules to be applied are defined, such as: Rule 1=If A and B and C are all true then Generate an Alert; Rule 2=If C and D and E are all true then Generate an Alert; Rule 3=If A and D and F are all true then Generate Alert; Rule 4=If B and E are both True then Assert F is true. Fact F can be inferred using an inference engine using Rule 4 in this example.

Figure 2:
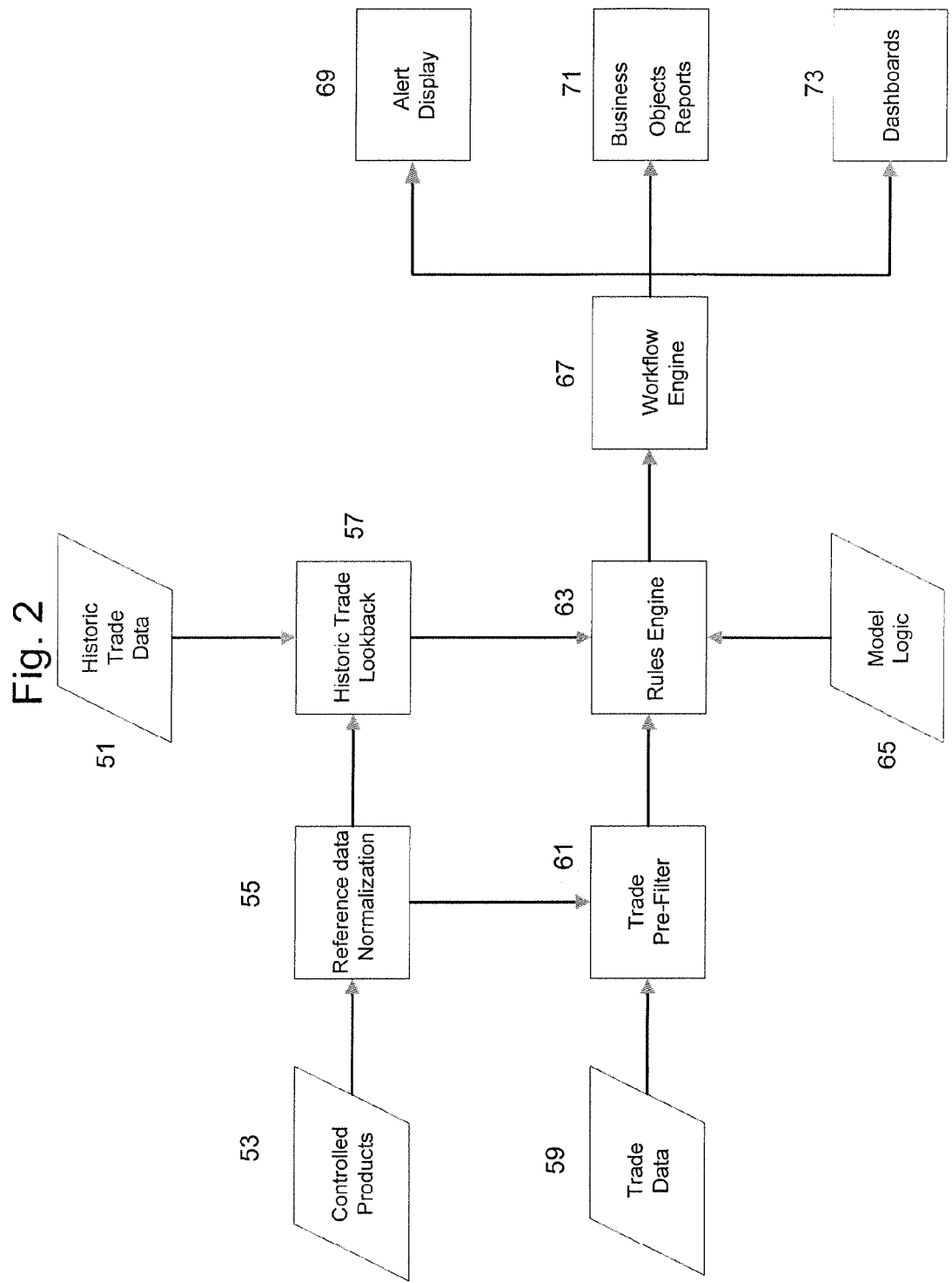
FIG. 2 is a block diagram of an embodiment of the system and method of the present invention.

FIG. 2 illustrates an example of a specific exemplary implementation of the system and method of the present invention generally described with respect to FIG. 1. In this embodiment, a model logic 65 is provided which identifies the type of rules which are to be created and implemented by this system. Additionally, Facts are created from data collected from various sources, including, for example, historic trade data 51, control products information 53, and trade data 59. The data is then normalized, as necessary, into a format (e.g., binary Facts with appropriate identification information) which is capable of being analyzed the rule engine. In this regard, the reference data normalizations module 55 may map the control products data 53 into a format that will be processed for use and evaluation by the rules engine 63. The trade pre-filter 61 extracts and transforms the trade data 59 and the mapped data from module 55 into a format (e.g., binary Facts with appropriate identification information) that is useable by the rules engine 63 to evaluate whether an event has occurred.

Additionally, the controlled products data 53, as normalized by module 55, may be analyzed in conjunction with the historic trade data 51. To this end, the historic trade look back module 57 receives the mapped data from module 55 and the historic trade data 51, and generates an output signal than is sent to the rules engine 63. The rules engine 63 processes the output signal from the historic trade lookback module 57 and Facts from the trade pre-filter 61, along with model logic 65. As a result, the rules engine 63 outputs one or more signals which are sent to the workflow engine 67. In this embodiment, the work flow engine 67 outputs reports to appropriate reporting systems 69, 71, 73.

Figure 3:
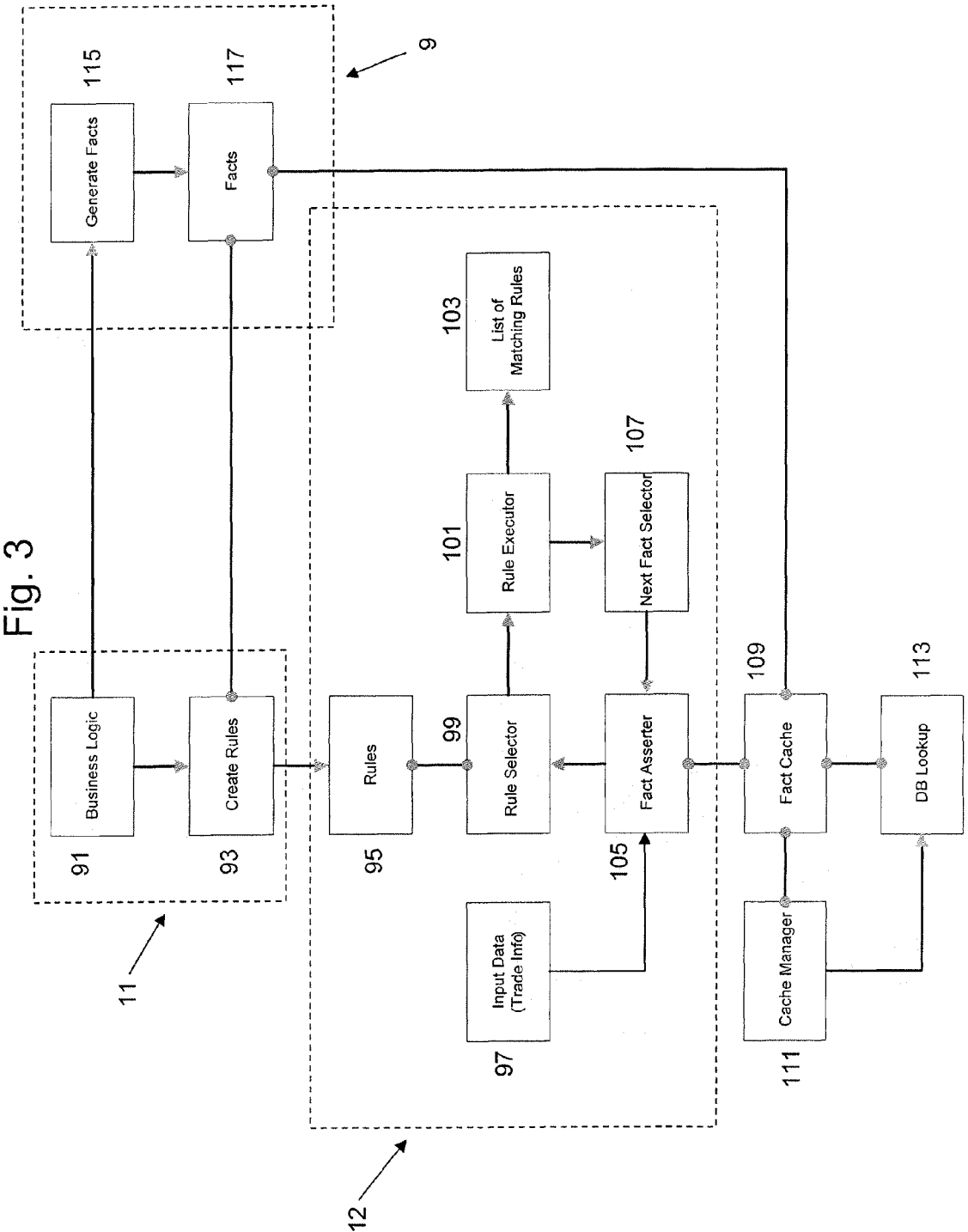
FIG. 3 is a block diagram of certain components of the system of FIG. 1.

FIG. 3 illustrates the operation of various components of the system of FIG. 1 in the context of an exemplary embodiment. As discussed with reference to FIG. 1, the models and rule development 11 may be implemented by identifying a business logic in block 91 and creating rules in block 93. As result, rules are provided and identified at block 95. Moreover, binary Facts (see, e.g., blocks 21, 23, 25 and 27 of FIG. 1) are generated and identified in blocks 115 and 117 and associated with identification information. Facts are provided from the Fact Asserter 105, which receives data from the input data module 97 (e.g., trade information) and/or Facts from fact cache 109.

Frequently processed facts 117 along with the potentially matching rules from Rule Cluster that has the same Rule Category as the Fact's Fact Category may be stored in fact cache 109, where they await the opportunity to be used by the fact asserter 105. This allows for greater performance against large rule sets and large data sets, where the same Data Elements frequently appear in the Events, by allowing Rule evaluation to be bypassed. Additionally, the cache automatically optimizes itself during runtime so that frequently used Facts can be retrieved faster from the cache then less frequently used Facts. This allows for internal system memory management to be better optimized for real-world performance rather than simply reducing the theoretical worst-case performance as is the case with typical optimization methods. The fact cache 109 is managed by the cache manager 111, which may access a database lookup 113 to evaluate the priority of the fact cache 109.

A rule selector 99 selects rules in accordance with the methods discussed above and applies Facts to the selected rules. Since more than one set of Rules may be available for analysis, the rule selector 99 identifies which, if any, rules are appropriate to analyze the selected Facts. In this regard, the rule selector 99 receives Facts and data from the Fact Asserter 105, which receives input data (e.g., trade information) from module 97 and Facts 117 from fact cache 109. The resulting Facts 117 and data 97 from fact assertor 105 and Rules 95 from Rule selector 99 are then processed and evaluated by the rule executor 101. The rule executor 101 outputs one or more signals that indicate whether an event has occurred. Thereafter, the output from the Rule executor is provided on a List of Matching Rules 103. Additionally, the next fact selector 107 will use this output to select more facts for processing in accordance with the above method.

Exemplary Embodiments of Implementation of Rules and Facts of the Presentation Invention The following is an exemplary description of the manner in which the rules and facts of the present invention may be generated, used, and evaluated. FIG. 4 illustrates this exemplary embodiment of the present invention. In this embodiment, the following steps may be performed:

(1) Predefine and persist Contexts within which Facts can be Asserted. (e.g., C=Context).

(2) Predefine and persist Fact Categories to which a Fact can belong. (e.g., T=Fact Category).

(3) Predefine and persist Facts that represent concepts that will be meaningful in designing Rules to identify Events of interest. (E.g., F<C,T>=A Fact F of Fact Category T that can be Asserted in Context C).

(4) Predefine and persist Rules that consist of multiple Facts that when occurring in conjunction with each other in an Event, signify that the Event is of interest to the Rule Designer. E.g.,
R{F<C,T>[0|1], F<C,T>[0|1], F<C,T>[0|1]}=A Rule R where F<C,T> is the Fact, and F<C,T>[0|1] is the truth value that the Rule requires that Fact to be Asserted as in order to match. True=1 and False=0. Each F<C,T>[0|1] within R is a separate Fact that must exist, in conjunction with all other Facts within the Rule, in an Event's set of Asserted Facts in order for the Rule to match an Event.

(5) Implement one or a series of functions (Fact Asserters) that when passed a Data Element as an argument return an Asserted Fact or a set of Asserted Facts that can be Asserted based upon what is known about the Data Element. E.g.,
S(D)={A(D<I>F<C,T>[0|1]), A(D<I>F<C,T>[1|1]), A(D<I>F<C,T>[0|1]), . . . } where S is the Fact Asserting function, D is the Data Element, D<I> is the Context instance from which D was obtained, and A(D<I>F<C, T>[0|1]) is the Fact F<C,T> being Asserted F<C,T> [0|1] within the context instance of D<I>. Each A(D<I>F<C,T>[0|1]) within S(D)'s result set is a different Asserted Fact asserted based on the same D. If the same Fact F<C,T> is Asserted multiple times for D, then the Context instance D<I> must be different for each of those Asserted Facts.

(6) (Pre)Assert all Facts pertaining to Data Elements that are known to be part of the Events, or are likely to be part of an Event. For all D, add S (D) to P{ }—after which P{ } will consist of all A(D<I>F<C,T>[0|1]) for all known D.

(7) Import all Facts F<C,T> into a computer runtime and assign each F a unique identification number that is a multiple of 2 ($2^n$).

(8) Import all Rules R{F<C,T>[0|1], F<C,T>[0|1], F<C, T>[0|1] . . . } into the computer runtime and assign each R a unique identification number that is a multiple of 2 ($2^n$). At the same time, for each F<C,T>[0|1] within R, add a reference to R to the corresponding F indicating that R requires F to be either True or False. All references to R should be added together with any existing Rule references by performing a binary "or" operation on the identification numbers.

(9) Import all A(D<I>F<C,T>[0|1]) from P{ } into the computer runtime. At the same time access F and identify all R that require F<C,T>[0|1] to have the same value as within R. Store each D from A(D<I>F<C,T>[0|1]) along with a reference to all R, related to D or not, whenever D does not already exist in storage. If D already exists then "and" together the R related to D with those R that D is already related to. Additionally, if D<I> does not exist in storage then relate D<I> to D; if D<I> is already related to D in storage, then "or" together the related R to those R that are already related to D<I>. All references to R should be added to any existing Rule references in D or D<I> by performing binary "and" or "or" operations on the identification numbers.

(10) Import each Event E into the computer runtime. Simultaneously lookup from storage the related R for each D in the Event, performing the lookup one D at a time. After each lookup perform a binary "and" operation on the set of related R just looked up, with the set of related R already looked up and "and-ed" together thus far. Continue this process for each D until either the "and" operation returns an empty set, or all D have been looked up. An empty set indicates that no Matching Rules exist and the Event is not of interest, whereas a non-empty result set indicates that Matching Rules where found and the Event is of interest. An empty set will have the physical numeric value of 0, whereas a non-empty set will have a non-zero physical numeric value.

(11) Perform a binary "and" operation between the identification number of each R and the non-empty result set from step 10. Any "and" operation between the result set and the id number of a R that returns the same id number indicates that that R is a Matching Rule for that Event.

Figure 5:
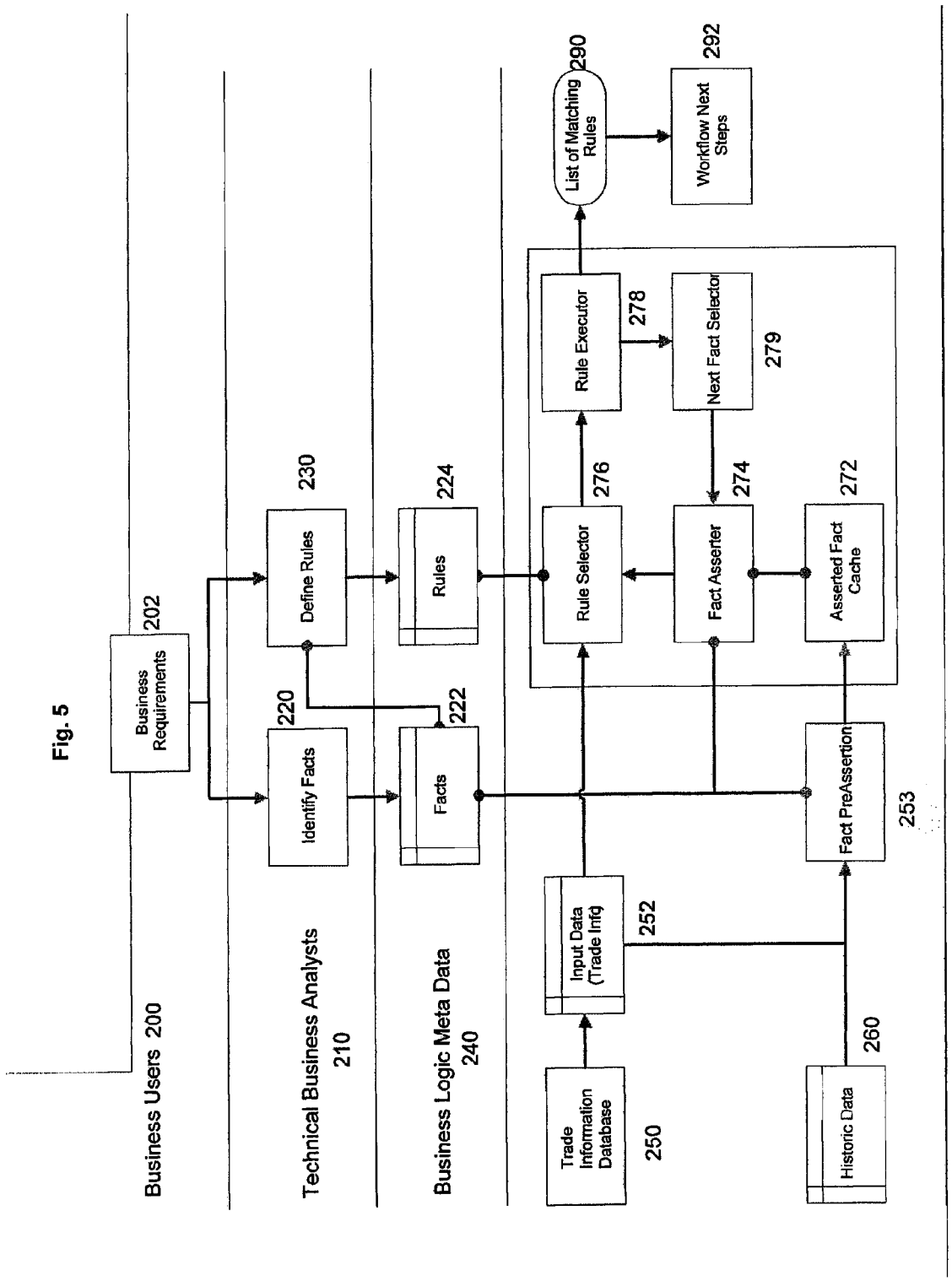
FIG. 5 is another example of an implementation of an embodiment of the present invention.

FIG. 5 further illustrates an exemplary application flow of an embodiment of the present invention such as herein. In this embodiment, Business Users 200 define the Business Requirements 202, as shown in Business and Regulatory Requirement 13 in FIG. 1 These Business Requirements 202 are used by Technical Business Analysts 210 to Identify Facts 220 and Define Rules 230 as discussed above. Business Logic Meta Data 240 is used to identify Facts 222 and Rules 224. The identified Facts 222 are used by the Technical Business Analysts to Define Rules used for form Rules 224.

Data from various databases are used to gather the Facts to be applied. For example, a Trade Information Database 250 is used to provide data to the Input Data Module 252. Similarly, in this example Historic Data 260 stored in one or more databases is provided to the Input Data Module 252 to generate Facts. The various forms of data are provided to the Fact PreAssertion Module 253 as described in Step (6) above. The output of the Fact PreAssertion module 253 may be fed into the Asserted Fact Cache 272, Fact Asserter 274 and Rule Selector 276, which operate in a manner consistent as described above. The Rule Selector 276 will use the Rule information and the Fact Information provided to identify which Rule or Rules should be applied against the Facts. The selected Rules and Facts to be analyzed are provided to the Rule Executor 278 which executes the selected Rule against the identified Facts. If a set of Facts is identified to match a rule, the output is provided to the List of Matching Rules module 290 and sent to the WorkFlow Next Steps 292. After the selected Rules are applied against the identified facts, a signal is sent to the Next Fact Selector 279 to begin processing of the next facts to be analyzed.

The foregoing systems and methods of the present invention can be implemented on one or more computers having a processor, operating system, memory, and communication device. Moreover, the system and method of the present invention may be deployed across an open or closed network, including, for example, the Internet, a wide area network, a local area network, intranet, etc. Embodiments of the present invention comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM to name a few. For ease of exposition, not every step or element of the present invention is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the present invention.

Now that embodiments of the present invention have been shown and described in detail, various modifications and improvements thereon will become readily apparent to those skilled in the art. Accordingly, the spirit and scope of the present invention is to be construed broadly and limited only by the appended claims and not by the foregoing specification.

What is claimed is:

1. A computerized method comprising the steps of:
   electronically identifying one or more requirements;
   developing using a logic model unit one or more logic rules based on the one or more requirements;
   generating using a data adaptor one or more binary facts based on collected data;
   selecting a slab-set of the one or more logic rules that relate to the one or more binary facts; and
   identifying using a rules engine an occurrence of one or more events by applying the sub-set of the one or more logic rules to the one or more binary facts.

2. The computerized method of claim 1, further comprising tracking a number of occurrences of the one or more events.

3. The computerized method of claim 1, further comprising determining whether an electronic alert should be generated for the occurrence of the one or more events.

4. The computerized method of claim 1, further comprising tracking one or more reoccurring patterns in the one or more events.

5. The computerized method of claim 4, further comprising the step of modifying using a rule tuning engine the one or more logic rules based on the one or more reoccurring patterns.

6. The computerized method of claim 1, further comprising generating an electronic audit report.

7. The computerized method of claim 1, wherein the one or more requirements are based on regulations of the Securities and Exchange Commission.

8. The computerized method of claim 1, wherein the collected data comprises at least one of the following: market data, trading system data, historic data and reference data.

9. The computerized method of claim 1, wherein the step of generating using a data adaptor comprises storing the one or more binary facts in a cache memory.

10. A system comprising:
    a logic model unit comprising a non-transitory computer readable medium containing computer readable instructions executable on a processor to develop one or more logic rules based on one or more requirements;
    a data adaptor comprising a non-transitory computer readable medium containing computer readable instructions executable on a processor to generate one or more binary facts based on collected data; and
    a rules engine comprising a non-transitory computer readable medium containing computer readable instructions executable on a processor to identify an occurrence of one or more events by selecting a sub-set of the one or more logic rules that relate to the one or more binary facts and applying the sub-set of the one or more logic rules to the one or more binary facts.

11. The system of claim 10 further comprising a work flow system that tracks a number of occurrences of the one or more events.

12. The system of claim 10, further comprising a work flow system that determines whether an alert should be generated for the occurrence of the one or more events.

13. The system of claim 10, further comprising a work flow system that tracks one or more reoccurring patterns in the one or more events.

14. The system of claim 13, further comprising a rule tuning engine that modifies the one or more logic rules based on the one or more reoccurring patterns.

15. The system of claim 10, further comprising a work flow system that generates an audit report.

16. The system of claim 10, wherein the one or more requirements are based on regulations of the Securities and Exchange Commission.

17. The system of claim 10, wherein the collected data comprises at least one of the following: market data, trading system data, historic data and reference data.

18. The system of claim 10, further comprising a cache memory that stores the one or more binary facts.

19. A system comprising a non-transitory computer readable medium containing computer readable instructions executable on a processor to perform a method comprising the steps of:
- electronically identifying one or more requirements;
- developing using a logic model unit one or more logic rules based on the one or more requirements;
- generating using a data adaptor one or more binary facts based on collected data;
- selectin a sub-set of the one or more logic rules that relate to the one or more binary facts; and
- identifying using a rules engine an occurrence of one or more events by applying the sub-set of the one or more logic rules to the one or more binary facts.

20. The system of claim 19, further comprising tracking a number of occurrences of the one or more events.

21. The system of claim 19, further comprising determining whether an electronic alert should be generated for the occurrence of the one or more events.

22. The system of claim 19, further comprising tracking one or more reoccurring patterns in the one or more events.

23. The system of claim 22, further comprising the step of modifying using a rule tuning engine the one or more logic rules based on the one or more reoccurring patterns.

24. The system of claim 19, further comprising generating an electronic audit report.

25. The system of claim 19, wherein the one or more requirements are based on regulations of the Securities and Exchange Commission.

26. The system of claim 19, wherein the collected data comprises at least one of the following: market data, trading system data, historic data and reference data.

27. The system of claim 19, wherein the step of generating using a data adaptor comprises storing the one or more binary facts in a cache memory.

* * * * *